(12) United States Patent
Zheng et al.

(10) Patent No.: US 11,263,325 B2
(45) Date of Patent: Mar. 1, 2022

(54) SYSTEM AND METHOD FOR APPLICATION EXPLORATION

(71) Applicant: McAfee, LLC, San Jose, CA (US)

(72) Inventors: Yi Zheng, Los Gatos, CA (US); Ameya M. Sanzgiri, Fremont, CA (US)

(73) Assignee: McAfee, LLC, San Jose, CA (US)

( * ) Notice: Subject to any disclaimer, the term of this patent is extended or adjusted under 35 U.S.C. 154(b) by 288 days.

(21) Appl. No.: 16/263,667

(22) Filed: Jan. 31, 2019

(65) Prior Publication Data

US 2020/0250310 A1 Aug. 6, 2020

(51) Int. Cl.
*G06F 21/56* (2013.01)
*G06F 21/57* (2013.01)
*H04L 29/06* (2006.01)

(52) U.S. Cl.
CPC .......... *G06F 21/564* (2013.01); *G06F 21/577* (2013.01); *H04L 63/145* (2013.01)

(58) Field of Classification Search
CPC ..... G06F 21/564; G06F 21/577; H04L 63/145
See application file for complete search history.

(56) References Cited

U.S. PATENT DOCUMENTS

| | | | |
|---|---|---|---|
| 5,987,610 A | 11/1999 | Franczek et al. | |
| 6,002,798 A * | 12/1999 | Palmer | G06F 16/313 382/176 |
| 6,073,142 A | 6/2000 | Geiger et al. | |
| 6,460,050 B1 | 10/2002 | Pace et al. | |
| 7,506,155 B1 | 3/2009 | Stewart et al. | |
| 9,117,078 B1 | 8/2015 | Chien et al. | |
| 2012/0002839 A1* | 1/2012 | Niemela | G06F 21/566 382/100 |
| 2013/0019310 A1 | 1/2013 | Ben-Itzhak et al. | |
| 2013/0311653 A1 | 11/2013 | Hernandez et al. | |
| 2017/0169224 A1 | 6/2017 | Park et al. | |
| 2018/0060222 A1* | 3/2018 | Kogan | G06F 8/70 |
| 2020/0159647 A1* | 5/2020 | Puszkiewicz | G06K 9/6256 |

OTHER PUBLICATIONS

PCT International Search Report and Written Opinion issued in PCT Application No. PCT/US2020/015283 dated May 22, 2020; 9 pages.

* cited by examiner

*Primary Examiner* — Nelson S. Giddins
(74) *Attorney, Agent, or Firm* — Patent Capital Group

(57) ABSTRACT

Particular embodiments described herein provide for an electronic device that can be configured to capture an image on a display, where the image includes at least one user interface element and is part of an application, create a screen signature of the image, determine an exploration strategy for the image based on the screen signature, and perform the exploration strategy on the image. The image can be abstracted to create the screen signature and the exploration strategy includes interacting with each of the at least one user interface elements.

19 Claims, 13 Drawing Sheets

SYSTEM AND METHOD FOR APPLICATION EXPLORATION

TECHNICAL FIELD

This disclosure relates in general to the field of information security, and more particularly, to a system and method for application exploration.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, administrative challenges remain for protecting computers and computer networks from malicious and inadvertent exploitation by malicious software and/or malicious operators.

BRIEF DESCRIPTION OF THE DRAWINGS

To provide a better understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth examples of apparatuses, methods, and systems relating to an application exploration in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that embodiments such as disclosed herein may be practiced without these specific details. In other instances, known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
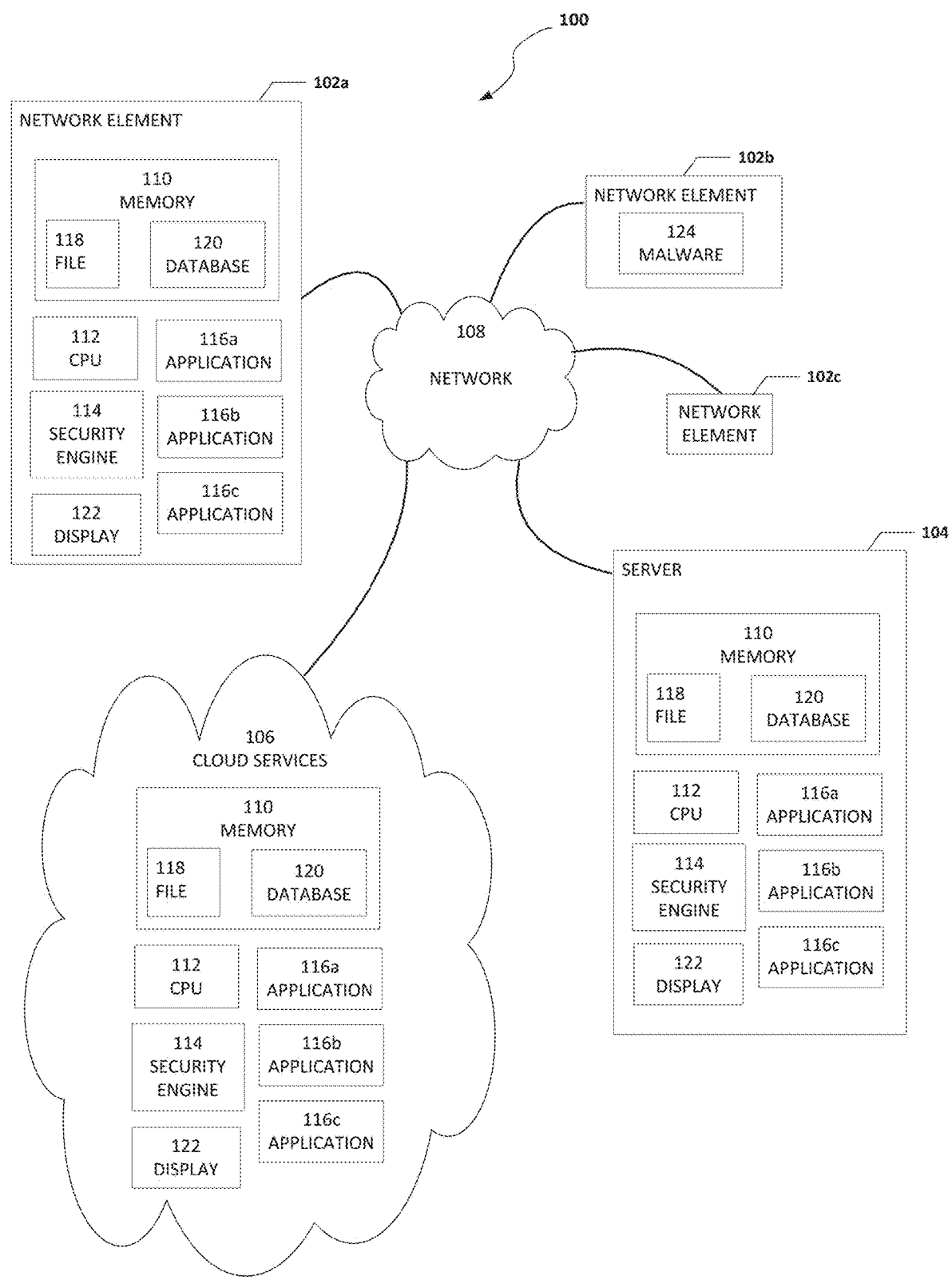
FIG. 1 is a simplified block diagram of a system to help facilitate a system and method for application exploration in accordance with an embodiment of the present disclosure.

FIG. 1 is a simplified block diagram of a system 100 to help facilitate an application exploration in accordance with an embodiment of the present disclosure. As illustrated in FIG. 1, an embodiment of system 100 can include network elements 102a-102c, a server 104, and cloud services 106. Network elements 102a-102c, server 104, and cloud services 106 may be in communication with each other using network 108.

Each of network elements 102*a*-102*c*, server 104, and/or cloud services 106 can include memory, a computer processing unit (CPU), a security engine, one or more applications, and a display. For example, as illustrated in FIG. 1, network element 102*a*, server 104, and cloud services 106 include memory 110, one or more CPUs 112, a security engine 114, one or more applications 116*a*-116*c*, and a display 122. The memory can include one or more files and a screen signature database. For example, as illustrated in FIG. 1, memory 110 can include one or more files 118 and a screen signature database 120.

Display 122 may be a physical display or a virtual or emulated display. The phases "displayed on a display," "displayed image," and derivative phrases is to include being displayed on a physical display and/or a virtual or emulated display. One or more of applications 116*a*-116*c* may be used by a malicious operator, may include exploits that can be used by a malicious operator, may expose sensitive data, may be a poorly designed application, etc. For example, malware 124 in network element 102*b* may use an exploit in application 116*c* to conduct malicious activity or may cause a malicious file (e.g., file 118) to be installed in network element 102*a*.

To help determine if an application (e.g., application 116*a*) may be used by a malicious operator, may include exploits that can be used by a malicious operator, may expose sensitive data, may be a poorly designed application, etc., an application analysis can be performed on the application. An application analysis involves analyzing the application and exploring and interacting with the application to try and determine what operating system calls are made, what kind of data being written, what data is being transferred, what types of data are being accessed, what input is being requested, etc. The results of the application analysis can be analyzed to determine if there is some type of malicious activity, if there are privacy issues, the application has user interface issues, the application is benign, etc.

Security engine 114 can be configured to explore and interact with an application and perform an application analysis. For purposes of this disclosure, security engine 114 is not configured to detect malware, determine if the application includes exploits, if the application exposes sensitive data or includes privacy issues, etc. but those features can be included in security engine 114 if desired. For example, to detect malware behavior from ransomware, a feature can be added to record the images on a display that have been explored and match the explored images with a ransomware database that includes strings or images that are indicative of ransomware behavior (e.g., an image or screen asking for bitcoins). In another example, to identify privacy data leaking, a feature can be added to record the traffic data that an application generates while the application is being explored and then compare the traffic data with a Uniform Resource Locator (URL) reputation database and determine if requests to malicious or suspicious URLs contain privacy information. Security engine 114 can be configured explore and interact with an application to determine what images an application causes to be displayed on a display that a user interacts with, how data is entered, how forms are filled out, what and how icons are clicked or selected, etc.

In an example, security engine 114 can be configured to capture or take a screenshot of a target image that is part of an application. More specifically, an application or file can cause the target image to be displayed on a display (e.g., display 122) for user interaction (e.g., the target image includes one or more user interface elements). The screenshot of the target image can be analyzed to create a screen signature. In an example, the screen signature can be an abstracted mathematical representation of the target image. The screen signature of the target image can be compared to known screen signatures in screen signature database 120.

Each of the screen signatures in screen signature database 120 are associated with an exploration strategy. The exploration strategy is a preset way of exploring an image that has a specific screen signature and the exploration strategy mimics a user's interaction with the user interface elements in the image. An exploration strategy can include a series of actions, including tap, scroll, input character, etc. that can be performed by a user as they interact with the target image. More specifically, the exploration strategy can include a series or set of events such as a taping on a certain area of the screen that includes the image, scrolling the image to the left or the right, scrolling the image up or down, inputting data, inputting a sequence of letters, numbers, and/or symbols (e.g., my_dummy_email@dummy_server.com), waiting for five (5) seconds, etc.). In an example, the series of actions in an exploration strategy may be a series of standardized actions. More specifically, the series of standardized actions may be one or more of the standardized actions by Linus Torvalds (2015) Linux (4.1-rc8) {operating system}, retrieved from https://www.kerneLorg/doc/html/v4.17/_sources/input/event-codes.rst.txt, herein incorporated by reference.

If the exploration strategy of the target image generates a new image that is displayed on the display, then a new screen signature of the new image can be generated, compared to known screen signatures in screen signature database 120 to determine a new exploration strategy for the new image, and the new image can be can be explored using the new exploration strategy. By using the exploration strategy associated with the screen signature in screen signature database 120 that is similar to the screen signature of the target image and an exploration strategy associated with any images generated during the exploration of the target image, the application associated with the target image can be explored. This allows the system to perform an application analysis on an application and can help the system determine if an application may be used by a malicious operator, may include exploits that can be used by a malicious operator, may expose sensitive data, may be a poorly designed application, etc.

If two images are similar, then the same exploration strategy can be used to interact with the images instead of having to use a random or brute force approach towards choosing the user interface elements to interact with or asking a human to interact with the image and/or record the process. Security engine 114 can be configured to determine the similarity of the images so that an administrator does not need to do brute force searching of the image or for similar images. This is a scalable system for a large number of applications, can reduce the search space dramatically, and can allow for analysis and exploration of an application without the need for an administrator to physically explore the application. The data in screen signature database 120 can be organized similar to a knowledge graph that can be searched using a Monte Carlo Tree Search or some other means that may be used to search screen signature database 120. Once an application has been explored, a separate process can analyze the results of the application exploration and attempt to determine if there is some type of malicious activity associated with the application, there are privacy issues associated with the application, the application has user interface issues, the application is benign, etc.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is useful to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, administrative challenges remain for protecting computers and computer networks from malicious and inadvertent exploitation by malicious software and devices. One-way security systems try to mitigate malware is to analyze applications and try to determine their risk to exploitation from malware or a malicious operator.

One of the most difficult challenges in application analysis is the automation of application exploration. The term "automation of application exploration," "automatic application exploration," and other similar terms that use the term "automatic" or derivations of the term "automatic" mean exploring one or more applications without human intervention or with minimal human intervention. As a core technology in the security and privacy domain, security analysists need to analyze and understand the security implications of their interaction with an application's elements before convicting applications. Towards this end, a security analysist can spend a lot of time trying to interact with applications to evaluate their risk for security, privacy, performance, etc. Therefore, what is needed is a system and method for application exploration.

A system and method to help facilitate an application exploration, as outlined in FIG. 1, can resolve these issues (and others). Using security engine 114, system 100 can be configured to use image similarity to determine exploration strategies for one or more images that are part of an application. More specifically, a screenshot of a target image that an application causes to be displayed on a display can be taken and the elements in the screenshot can then be estimated into abstract objects (e.g., geometric shapes such as rectangles). The abstract objects are then either assimilated or separated depending on the coordinates of the abstract objects (e.g., abstract objects that are very close to each other are assimilated, the ones that are far apart are kept separate) and a screen signature of the target image can be generated. For example, a similarity engine can extract a layout outline from images using geometric shapes. The screen signature of the abstracted image can be matched to an image with a similar screen signature that has an associated exploration strategy. The system can use the exploration strategy to explore the target image that is displayed on the display. By abstracting an image that an application causes to be displayed on a display, creating a screen signature of the image, and determining an exploration strategy for the image by using an exploration strategy of an image with a similar screen signature, the system allows for automated exploration of an application.

More specifically, instead of depending on access to an application's internal structure or code and an administrator manually exploring a target image displayed on a display, the system can use a known exploration strategy for an image that is similar to the target image to explore the target image. The exploration strategy is an exploration strategy that mimics a user's interaction with the target image displayed on a display. By using a known exploration strategy for an image that is similar to the target image displayed on the display, the system can determine the strategy of exploration for the target image that can increase coverage while minimizing (or at least reducing) time spent exploring the target image. This allows for the possibility of automation as instrumentation or recompiling by an administrator can be removed from the application exploration process. This makes the system extremely versatile as the system can abstract out the elements of the image in to geometric shapes and the system can become operating system agnostic. Being operating system agnostic eliminates the need for deeper analysis (e.g., call graph analysis) which is a requirement for current systems and is computationally inefficient. In some examples, the exploration strategy can be directly recorded, for example, by using the Android 'adb' command. Direct access to '/dev/input #' device on an Android device or an emulator can help the system to create an exploration strategy that can be used in cross-platform applications. For example, what is learned on an Android based operating system can be applied to iOS based operating system.

In an illustrative example, the system can capture the target image (e.g., take a screenshot of a target image) or an emulator can capture the target image (e.g., generate a screenshot) from a virtual representation of the target image. A screen signature can be created for the captured image and associated with the target image. The screen signature of the target image is used to query the screen signature database. The response to the query from the screen signature database can be one or more exploration strategies where each exploration strategy corresponds to a screen signature in the screen signature database that is similar to the screen signature of the target image. The system can execute the one or more exploration strategies returned from the screen similarity database to explore the target image. In an example, the system can categorize images into small sets such that all the images in a particular set are similar and can be explored with the same exploration strategy.

Turning to the infrastructure of FIG. 1, system 100 in accordance with an example embodiment is shown. Generally, system 100 can be implemented in any type or topology of networks. Network 108 represents a series of points or nodes of interconnected communication paths for receiving and transmitting packets of information that propagate through system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102a-102c can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. Server 104 can be a network element such as a server or virtual server and can be associated with clients, customers, endpoints, or end users wishing to initiate a communication in system 100 via some network (e.g., network 108). The term 'server' is inclusive of devices used to serve the requests of clients and/or perform some computational task on behalf of clients within system 100. Cloud services 106 is configured to provide cloud services to network elements 102a-102c. Cloud services may generally be defined as the use of computing resources that are delivered as a service over a network, such as the Internet. Often, compute, storage, and network resources are offered in a cloud infrastructure, effectively shifting the workload from a local network to the cloud network. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network elements 102a-102c, server 104, and cloud services 106 can include memory elements (e.g., memory 110) for storing information to be used in the operations outlined herein. Each of network elements 102a-102c, server 104, and cloud services 106 may keep information in any suitable memory element (e.g., disk, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102a-102c, server 104, and cloud services 106 may include software modules (e.g., security engine 114) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c, server 104, and cloud services 106 may include a processor (e.g., CPU 112) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
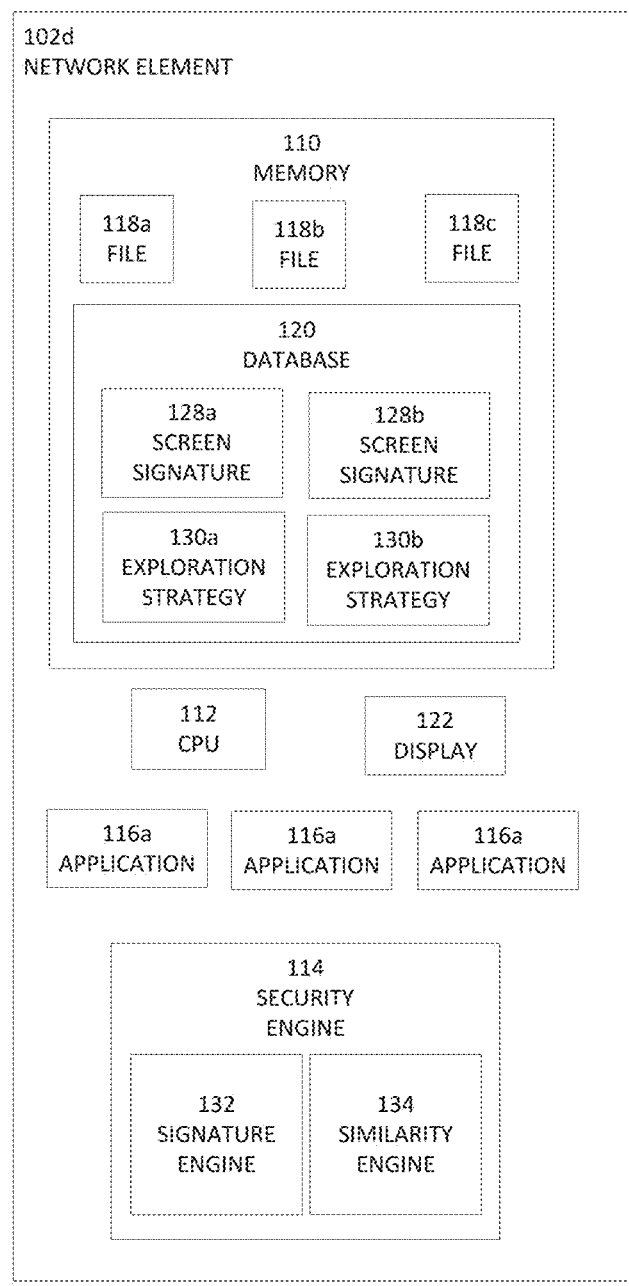
FIG. 2 is a simplified block diagram of a portion of a system to help facilitate a system and method for application exploration in accordance with an embodiment of the present disclosure.

Turning to FIG. 2, FIG. 2 is a simplified block diagram of a portion of a system 100 to help facilitate exploration of an application in accordance with an embodiment of the present disclosure. In an example, network element 102b can include memory 110, CPU 112, security engine 114, and one or more applications 116a and 116b. Memory 110 can include one or more files 118a-118c and screen signature database 120. Screen signature database 120 can include one or more screen signatures 128a and 128b. Each screen signature can include an associated exploration strategy. For example, screen signature 128a includes or is associated with exploration strategy 130a and screen signature 128b includes or is associated with exploration strategy 130b. Each screen signature 128a and 128b can be a screen signature or identifier of a specific image. Each exploration strategy is an exploration strategy that can be used to explore an image with a specific screen signature. For example, if a signature of a target image matches or is similar to screen signature 128a, then exploration strategy 130a can be used to explore the target image. Each exploration strategy 130a and 130b can be a series or set of events such as a taping on a certain area of the screen that includes the image, scrolling the image to the left or the right, scrolling the image up or down, inputting a sequence of letters, numbers, and/or symbols (e.g., 1_dummy_email@dummy_server23.com), waiting for five (5) seconds, etc.). For example, exploration strategy 130a may be to enter data into a user interface element and then selecting a "next" user interface element (e.g., a "next" icon).

Security engine 114 can include a signature engine 132 and a similarity engine 134. Signature engine 132 can be configured to create a screen signature of a target image. The screen signature can be an abstracted mathematical representation of a target image. Similarity engine 134 can be configured to use the screen signature created by the signature engine 132 to search screen signature database 120 and to identify similar images with a similar screen signature. Once a similar screen signature is found in screen signature database 120, an exploration strategy associated with the similar screen signature can be executed or performed on the target image.

Figure 3:
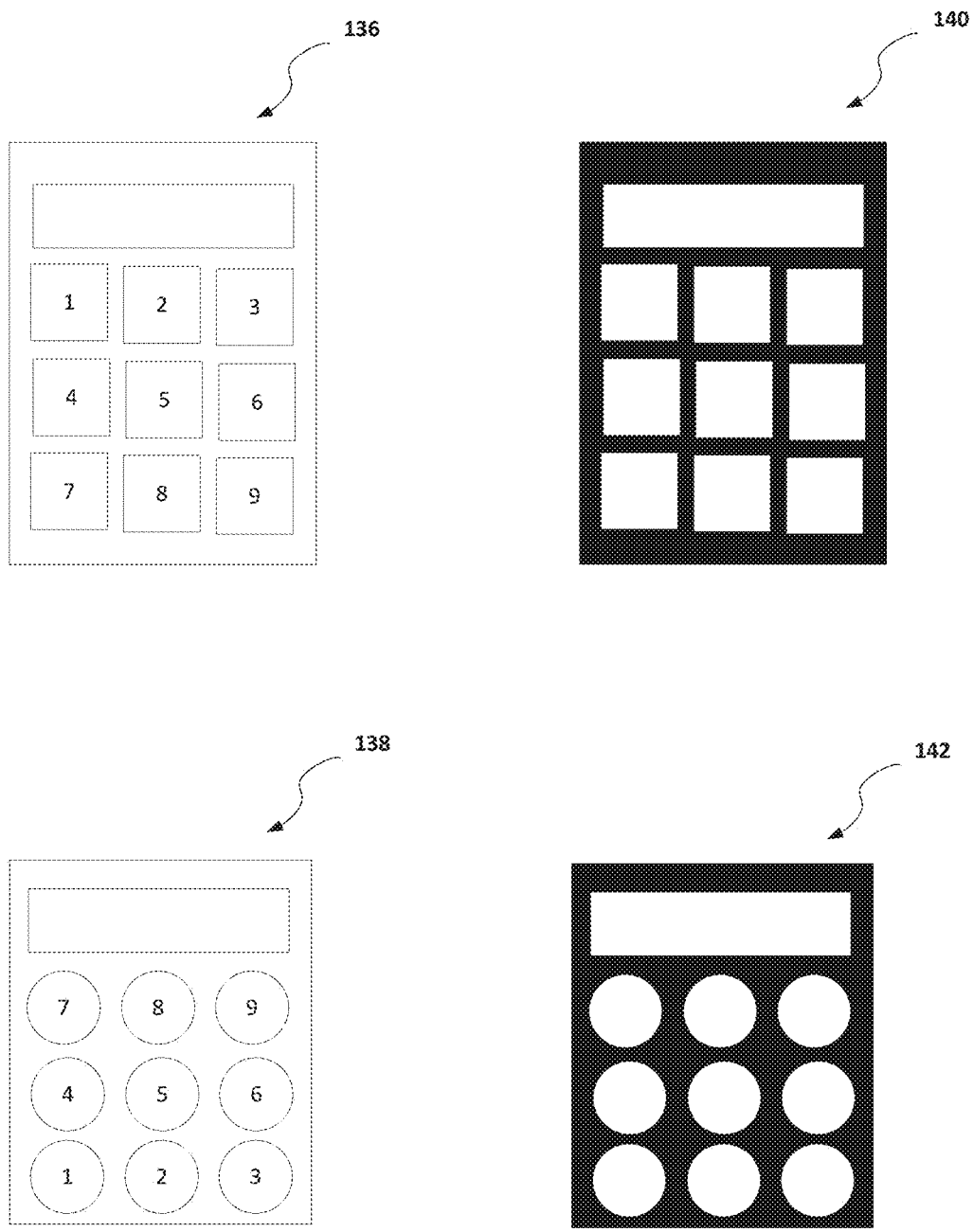
FIG. 3 is a simplified block diagram of a portion of a system illustrating example details to help facilitate a system and method for application exploration in accordance with an embodiment of the present disclosure.

Turning to FIG. 3, FIG. 3 is a block diagram of a system to help facilitate a system and method for application exploration, in accordance with an embodiment. FIG. 3 illustrates two different images that may be displayed on a display (e.g., display 122). In an example, a first screen image 136 may be part of a first application (e.g., application 116a) and has nine square user interface elements with the numbers 1-9 in consecutive order starting at the top most left box. A second screen image 138 may be part of a second application (e.g., application 116b) and has nine round user interface elements with the numbers 1-3 starting on the bottom row, then 4-6 on the middle row, and 7-9 on the top row. Current application exploration systems would determine that the images are different as the numbers are in a different order and the boxes, buttons, or user interface elements are different. However, the same exploration strategy could be used to explore each of first screen image 136 and second screen image 138.

Signature engine 132 (illustrated in FIG. 2) can be configured to create a screen signature (e.g., an abstracted representation) of first screen image 136 and second screen image 138. For example, signature engine 132 can create a first screen signature 140 from first screen image 136 and a second screen signature 142 from second screen image 138. As illustrated in FIG. 3, first screen signature 140 is similar to second screen signature 142 and the same exploration strategy could be used to explore each screen image. For example, an exploration strategy can be executed where the user interface elements are selected in one possible combination or order (e.g., the top row user interface elements are selected) or the user interface elements are selected in two or more different possible combinations orders.

Figure 4A:
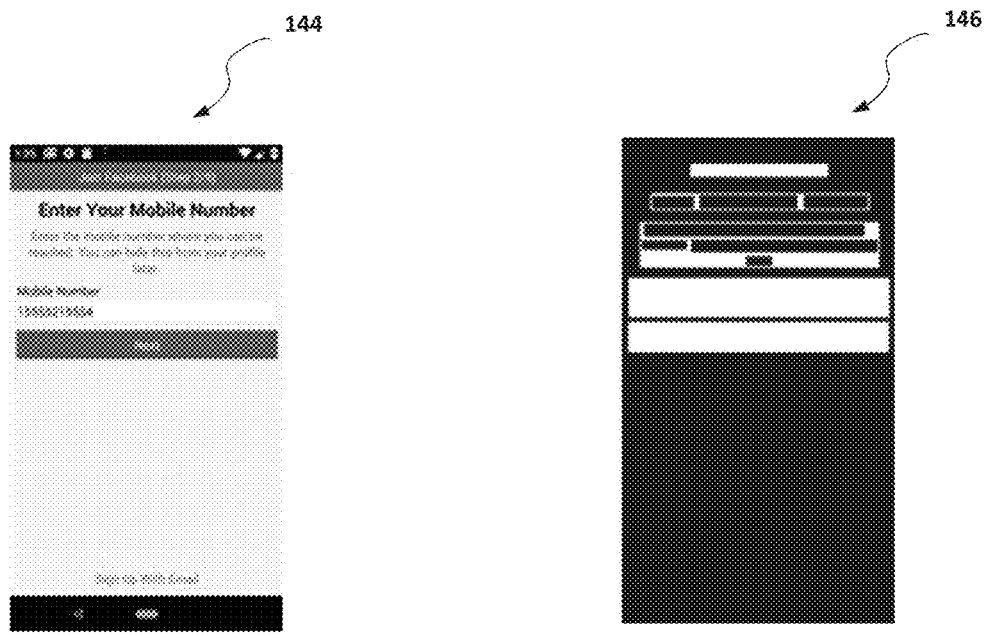
FIGS. 4A and 4B are a simplified block diagram of a portion of a system illustrating example details to help facilitate a system and method for application exploration in accordance with an embodiment of the present disclosure.
Figure 4B:
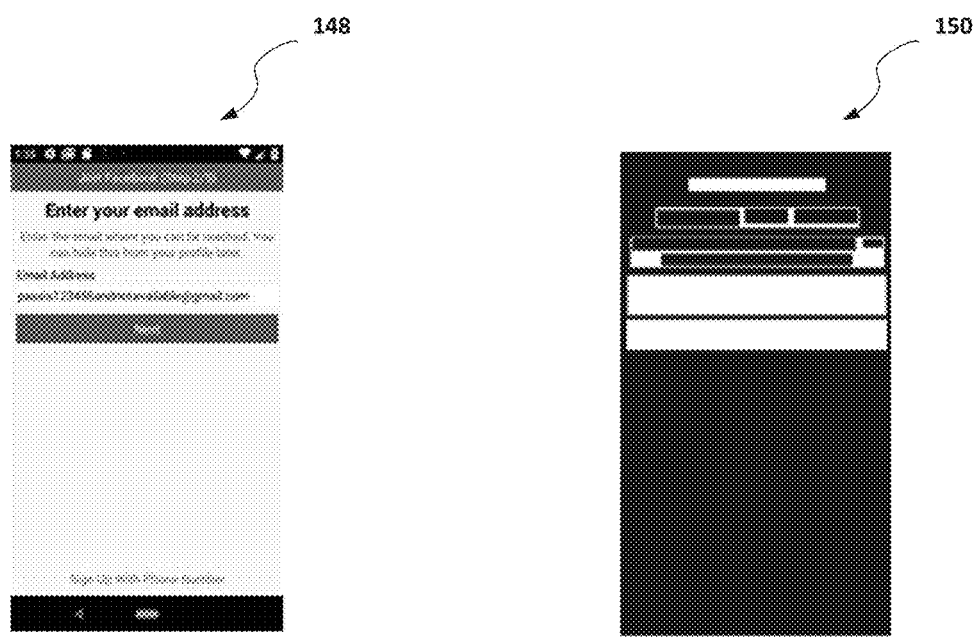

Turning to FIGS. 4A and 4B, FIGS. 4A and 4B are a block diagram of a system to help facilitate a system and method for application exploration, in accordance with an embodiment. In an example, as illustrated in FIG. 4A, an explored screen image 144 has user interface elements where a mobile number is to be entered and a next icon that can be selected. Signature engine 132 (illustrated in FIG. 2) can be configured to create an explored screen signature 146, where explored screen signature 146 is an abstracted representation of explored screen image 144. Explored screen signature 146 can be stored in screen signature database 120 (illustrated in FIG. 2) as a signature (e.g., screen signature 128a illustrated in FIG. 2). An exploration strategy (e.g., exploration strategy 130a illustrated in FIG. 2) can be created for explored screen image 144 and associated with explored screen signature 146. For example, the exploration strategy may include entering data into the user interface elements and selecting the "next" user interface element (the "next" icon).

In an example, as illustrated in FIG. 4B, a target screen image 148 may be part of an application that needs to be explored. Target screen image 148 can be captured and analyzed by signature engine 132 to create a target screen signature 150. Target screen signature 150 can be a signature of target screen image 148. Similarity engine 134 (illustrated in FIG. 2) can compare target screen signature 150 to signatures stored in screen signature database 120 (illustrated in FIG. 2) to try and determine one or more similar screen signatures. Because target screen signature 150 is similar to explored screen signature 146, a match can be identified and the exploration strategy associated with explored screen signature 146 can be used to explore target screen image 148. For example, the exploration strategy may be used to enter data into the user interface elements and select the "next" user interface element.

Figure 5:
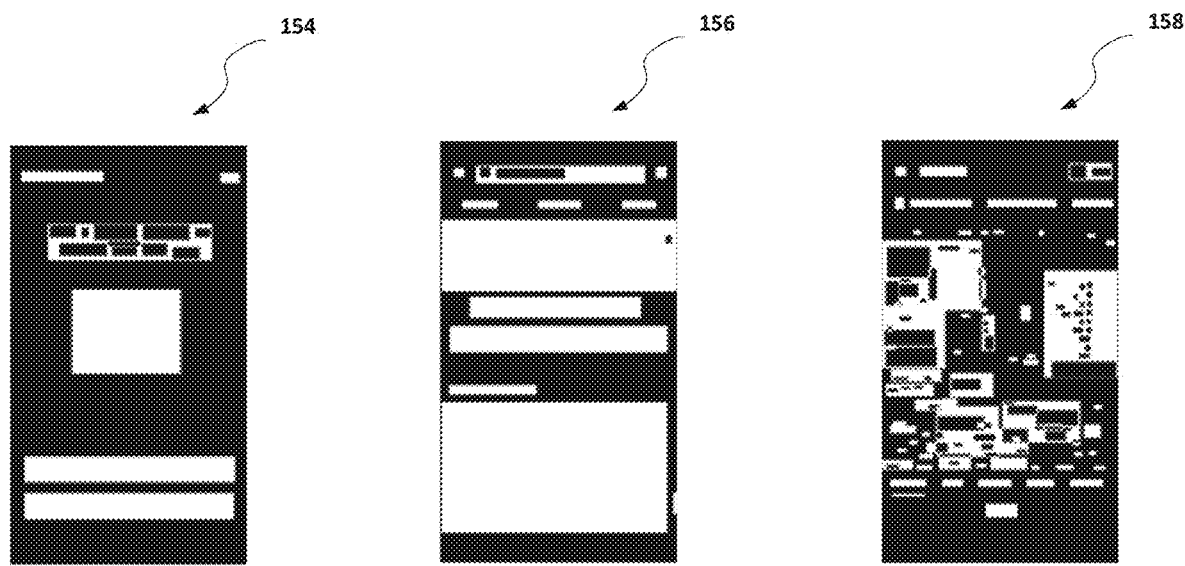
FIG. 5 is a simplified block diagram of a portion of a system illustrating example details to help facilitate a system and method for application exploration in accordance with an embodiment of the present disclosure.

Turning to FIG. 5, FIG. 5 is a block diagram of a system to help facilitate a system and method for application exploration, in accordance with an embodiment. FIG. 5 illustrates a third screen signature 154 and a fourth screen signature 156 that may be abstracted from two different images from two different webpages. In an example, third screen signature 154 can be an abstracted image from a webpage that allows viewing of video (e.g., YouTube) and fourth screen signature 156 can be an abstracted image from a webpage that allows viewing of news and/or headline related content (e.g., a newspaper's website). When third screen signature 154 is compared with fourth screen signature 156, a comparison result image 158 can be generated. As illustrated by comparison results image 158, the two images from the two different webpages are not similar and the same exploration strategy could not be used on both images. More specifically, an exploration strategy for a screen image that displays a video image would be very different than an exploration strategy for a screen image that includes news and/or headlines.

Figure 6:
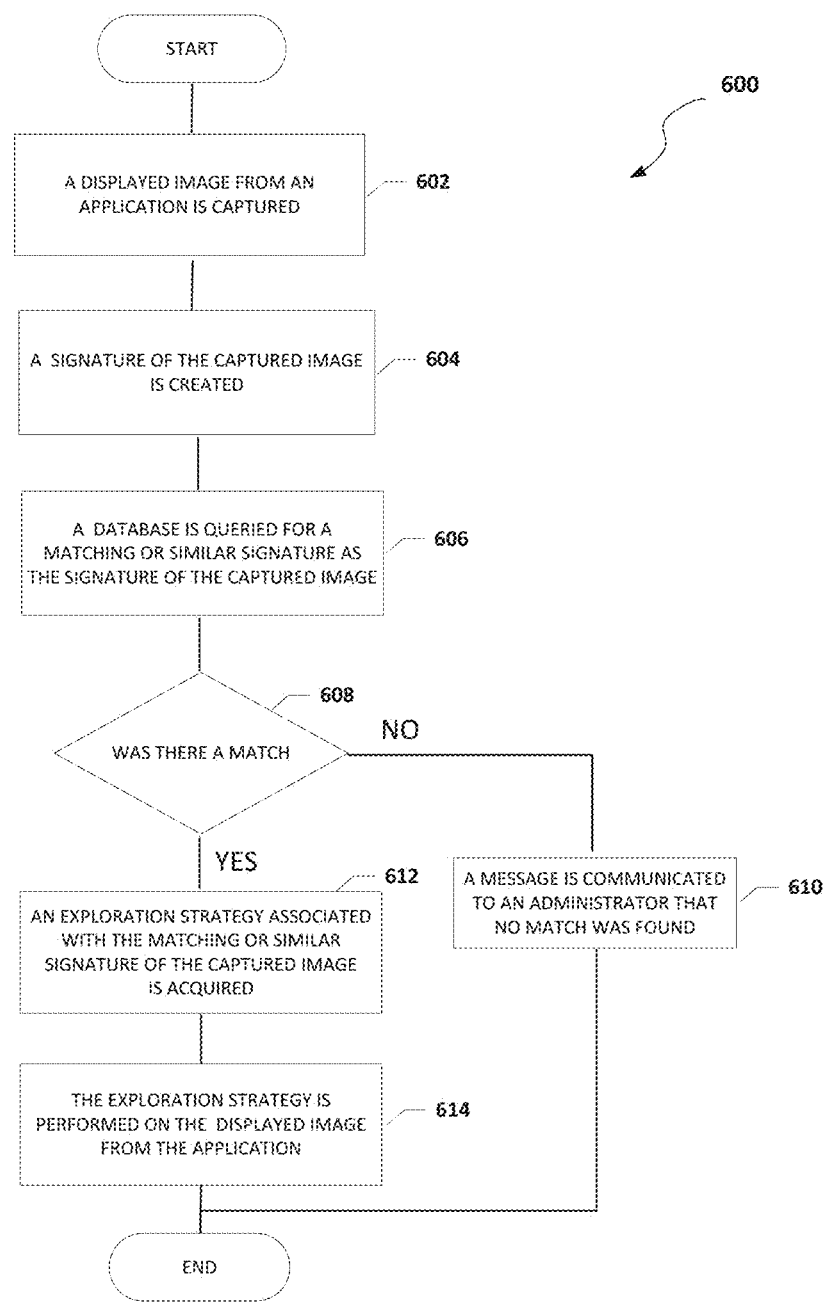
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with a system and method for application exploration, in accordance with an embodiment. In an embodiment, one or more operations of flow 600 may be performed by security engine 114, signature engine 132, and/or similarity engine 134. At 602, a displayed image from an application is captured. For example, a screenshot of the image may be generated. The displayed image can be part of an application. At 604, a signature of the captured image is created. At 606, a database is queried for a matching or similar signature as the signature of the captured image. At 608, the system determines if there was a matching or similar signature as the signature of the displayed image. If there was not a matching or similar signature as the signature of the displayed image, then a message can be communicated to an administrator that no match was found, as in 610. In an example, the message that no match was found may be part of a generated report that is communicated to an administrator after a period of time, a number of displayed images have been analyzed, a number of applications have been analyzed, or some other event. If there was a matching or similar signature as the signature of the displayed image, then an exploration strategy associated with the matching or similar signature of the displayed image is acquired, as in 612. At 614, the exploration strategy is performed on the displayed image from the application. The exploration strategy allows the system to explore at least a portion of the application that caused the image to be displayed on the display.

Figure 7:
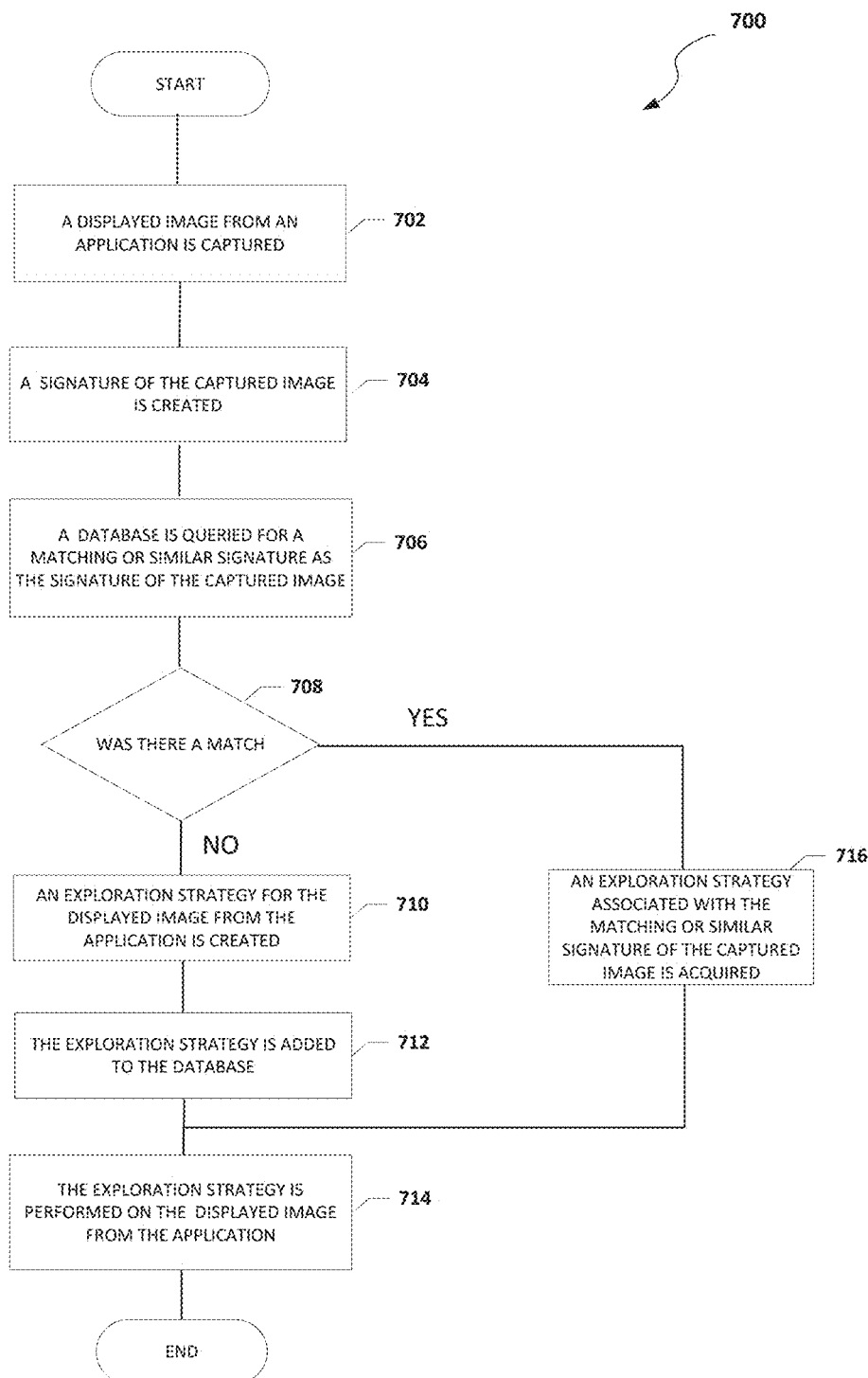
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with a system and method for application exploration, in accordance with an embodiment. In an embodiment, one or more operations of flow 700 may be performed by security engine 114, signature engine 132, and/or similarity engine 134. At 702, a displayed image from an application is captured. For example, a screenshot of the image may be generated. The displayed image can be part of an application. At 704, a signature of the captured image is created. At 706, a database is queried for a matching or similar signature as the signature of the captured image. At 708, the system determines if there was a matching or similar signature as the signature of the captured image. If there was not a matching or similar signature as the signature of the captured image, then an exploration strategy for the displayed image from the application is created, as in 710. At 712, the exploration strategy is added to the database. At 714, the exploration strategy is performed on the displayed image from the application. If there was a matching or similar signature as the signature of the captured image, then an exploration strategy associated with the matching or similar signature of the captured image is acquired, as in 716. At 714, the exploration strategy is performed on the displayed image from the application. The exploration strategy allows the system to explore at least a portion of the application that caused the image to be displayed on the display.

Figure 8:
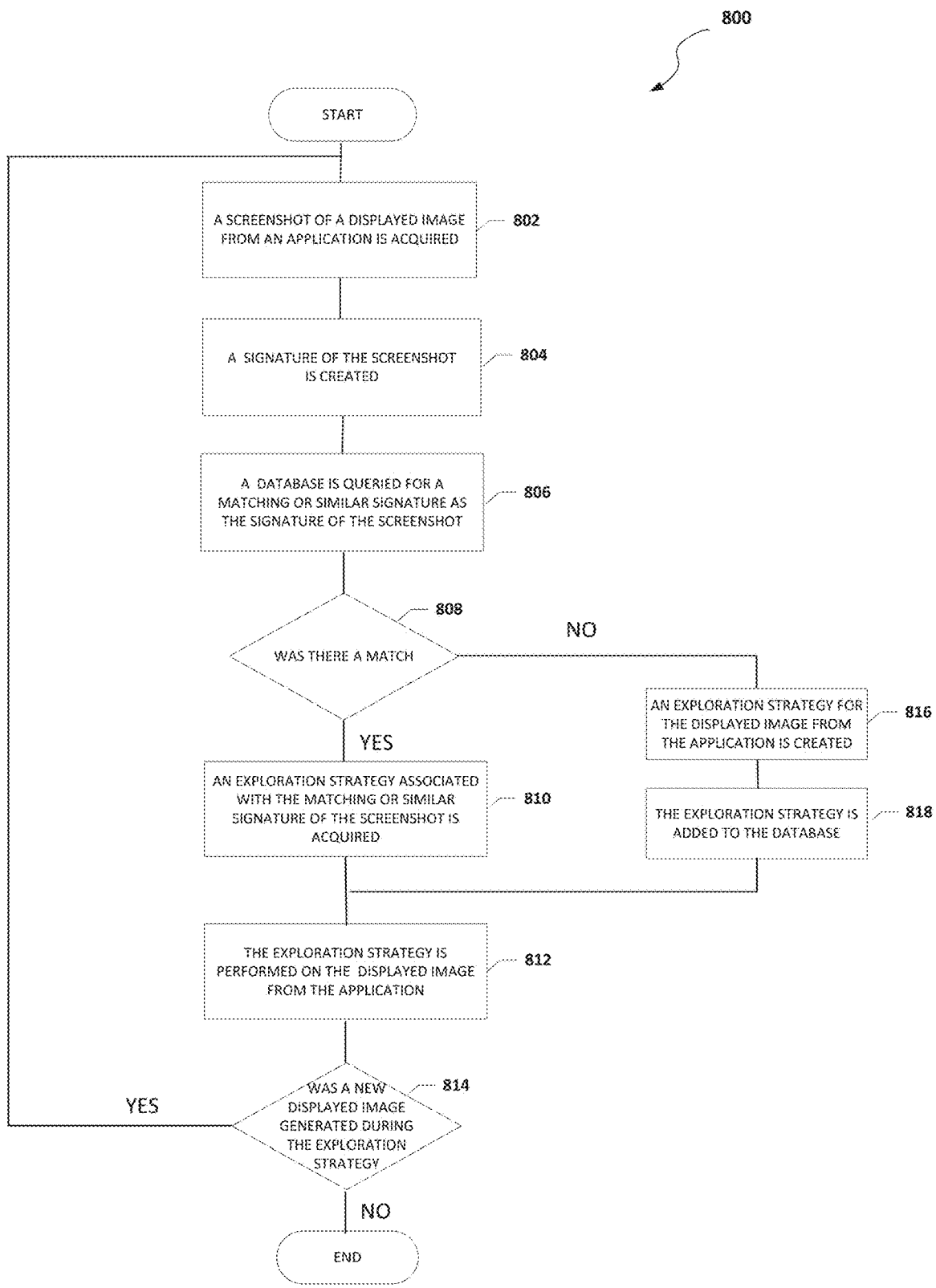
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with a system and method for application exploration, in accordance with an embodiment. In an embodiment, one or more operations of flow 800 may be performed by security engine 114 signature engine 132, and/or similarity engine 134. At 802, a screenshot of a displayed image from an application is acquired. In an example, the displayed image from the application is acquired by some means other than by a screenshot. At 804, a signature of the screenshot is created. At 806, a database is queried for a matching or similar signature as the signature of the screenshot. At 808, the system determines if there was a matching or similar signature as the signature of the screenshot. If there was a matching or similar signature as the signature of the screenshot, then an exploration strategy associated with the matching or similar signature of the screenshot is acquired, as in 810. At 812, the exploration strategy is performed on the displayed image from the application. At 814, the system determines if a new displayed image was generated during the exploration strategy. If a new displayed image was generated during the exploration strategy, then the system returns to 802, where a screenshot of the (new) displayed image from the application is acquired. If a new displayed image was not generated during the exploration strategy, then the process ends. If there was not a matching or similar signature as the signature of the screenshot, then an exploration strategy for the displayed image from the application is created, as in 816. At 818, the exploration strategy is added to the database. At 812, the exploration strategy is performed on the displayed image from the application and the system determines if a new displayed image was generated during the exploration strategy, as in 814. The exploration strategy of the target screen and any new images generated during execution of the exploration strategy allows the system to explore at least a portion of the application that caused the image to be displayed on the display.

Figure 9:
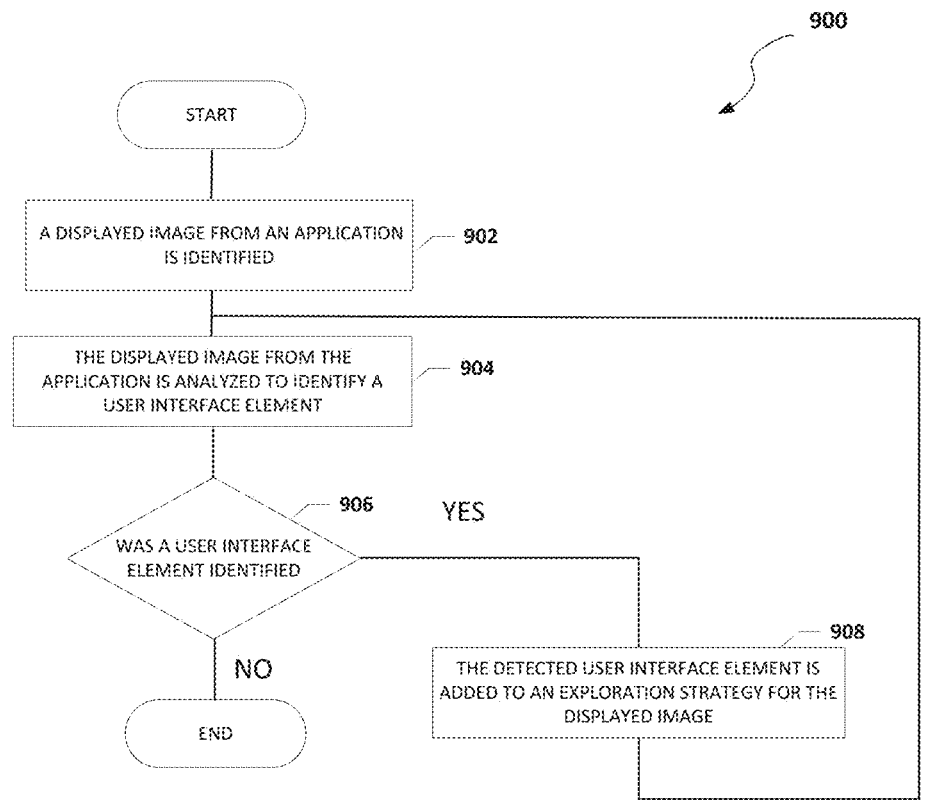
FIG. 9 is a simplified flowchart illustrating potential operations that may be associated with the system in accordance with an embodiment.

Turning to FIG. 9, FIG. 9 is an example flowchart illustrating possible operations of a flow 900 that may be associated with a system and method for application exploration, in accordance with an embodiment. In an embodiment, one or more operations of flow 900 may be performed by security engine 114, signature engine 132, and/or similarity engine 134. At 902, a displayed image from an application is identified. In an example, the displayed image from the application may be captured (e.g., the displayed image from the application may be captured by using a screenshot of the image or some other means). At 904, the displayed image from the application is analyzed to identify a user interface element. At 906, the system determines if a user interface element was detected. If a user interface element was detected, then the detected user interface element is added to an exploration strategy for the displayed image, as in 908 and the system returns to 904 where the displayed image from the application is analyzed to identify a new user interface element. At 906, the system determines if a (new) user interface element was detected. If a (new) user interface element was detected, then the detected (new) user interface element is added to an exploration strategy for the displayed image, as in 908 and the system returns to 904. The process ends when a user interface element (or new user interface elements) is not identified.

Figure 10:
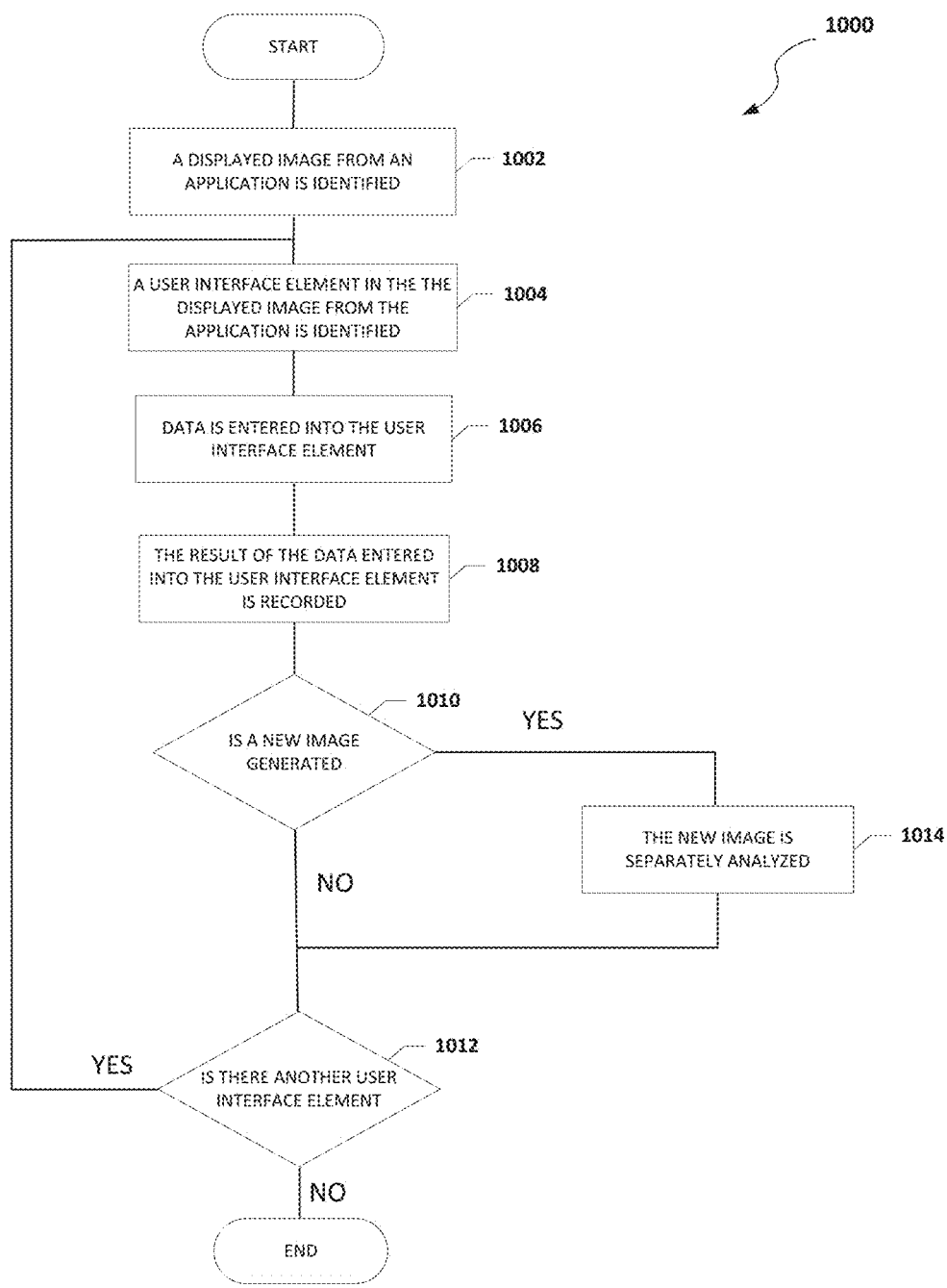
FIG. 10 is a simplified flowchart illustrating potential operations that may be associated with the system in accordance with an embodiment.

Turning to FIG. 10, FIG. 10 is an example flowchart illustrating possible operations of a flow 1000 that may be associated with a system and method for application exploration, in accordance with an embodiment. In an embodiment, one or more operations of flow 1000 may be performed by security engine 114, signature engine 132, and/or similarity engine 134. At 1002, a displayed image from an application is identified. In an example, the displayed image from the application may be captured (e.g., the displayed image from the application may be captured by using a screenshot of the image or some other means). At 1004, a user interface element in the displayed image from the application is identified. At 1006, data is entered into the user interface element. At 1008, the result of the data entered into the user interface element is recorded. For example, the result of the data being entered into the user interface element can be recorded in an application exploration report. The application exploration report can be used by an administrator to determine if an application includes some type of malicious activity, the application has privacy issues, the application may have navigation issues for a user, the application is benign, etc. At 1010, the system determines if a new image was generated. If a new image was not generated, then the system determines if there is another user interface element, as in 1012. If there is another user interface element, then the system returns to 1004 and a (new) user interface element in the displayed image from the application is identified. If a new image was generated, then the new image is separately analyzed, as in 1014 and the system determines if there is another user interface element, as in 1012. For example, based on the data entered into the user interface element, the application may cause a new image to be generated. In a specific example, the new image can be analyzed using one of flows illustrated in FIG. 6-8.

Figure 11:
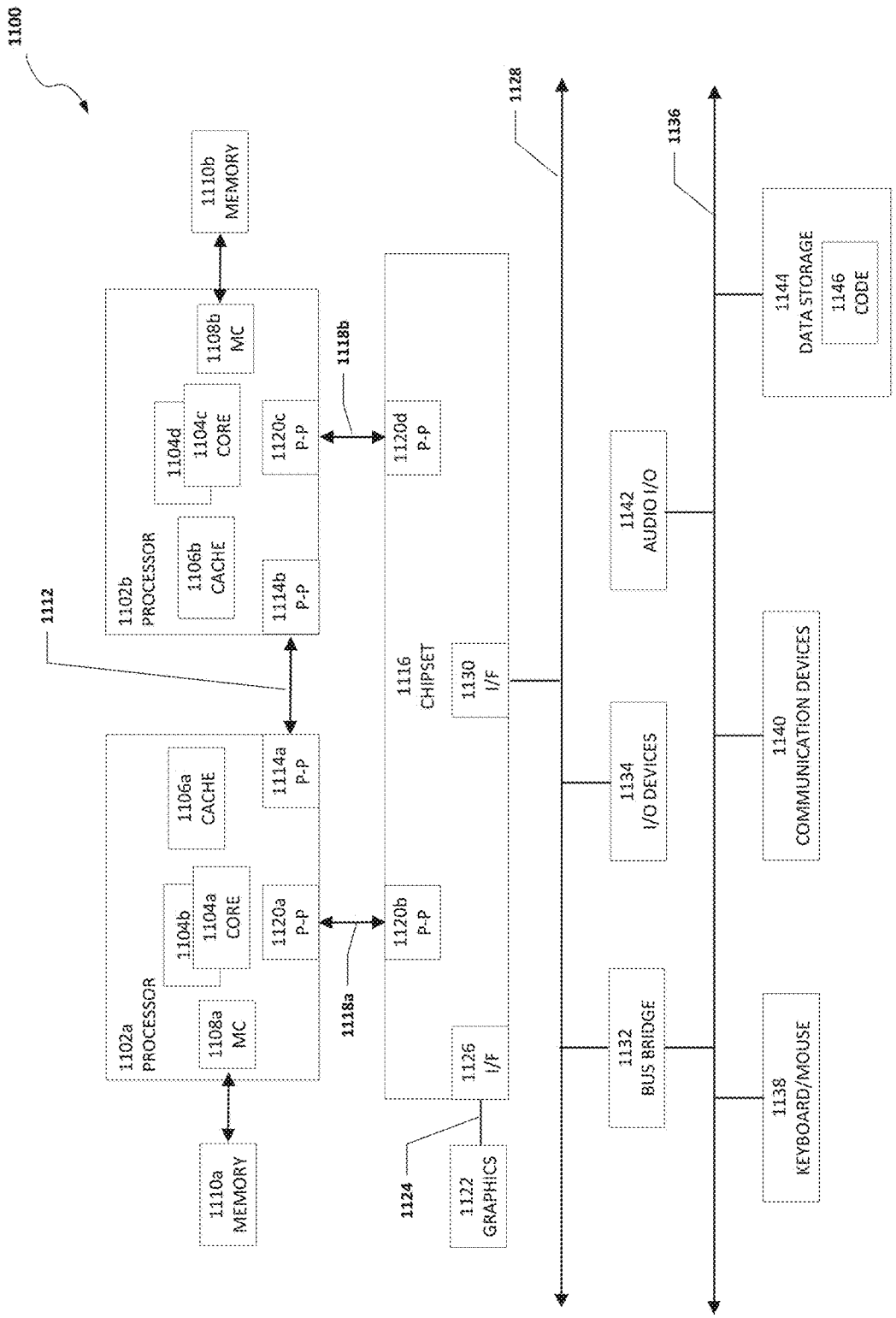
FIG. 11 is a block diagram illustrating an example computing system that is arranged in a point-to-point configuration in accordance with an embodiment.

Turning to FIG. 11, FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the network elements of system 100 may be configured in the same or similar manner as computing system 1100.

As illustrated in FIG. 11, system 1100 may include several processors, of which only two, processors 1102a and 1102b, are shown for clarity. While two processors 1102a and 1102b are shown, it is to be understood that an embodiment of system 1100 may also include only one such processor. Processors 1102a and 1102b may each include a set of cores (i.e., processors cores 1104a and 1104b and processors cores 1104c and 1104d) to execute multiple threads of a program. The cores may be configured to execute instruction code in a manner similar to that discussed above with reference to FIGS. 1-10. Each processor 1102a and 1102b may include at least one shared cache 1106a and 1106b respectively. Shared caches 1106a and 1106b may each store data (e.g., instructions) that are utilized by one or more components of processors 1102a and 1102b, such as processor cores 1104a and 1104b of processor 1102a and processor cores 1104c and 1104d of processor 1102b.

Processors 1102a and 1102b may also each include integrated memory controller logic (MC) 1108a and 1108b respectively to communicate with memory elements 1110a and 1110b. Memory elements 1110a and/or 1110b may store various data used by processors 1102a and 1102b. In alternative embodiments, memory controller logic 1108a and 1108b may be discrete logic separate from processors 1102a and 1102b.

Processors 1102a and 1102b may be any type of processor and may exchange data via a point-to-point (PtP) interface 1112 using point-to-point interface circuits 1114a and 1114b respectively. Processors 1102a and 1102b may each exchange data with a chipset 1116 via individual point-to-point interfaces 1118a and 1118b using point-to-point interface circuits 1120a-1120d. Chipset 1116 may also exchange data with a high-performance graphics circuit 1122 via a high-performance graphics interface 1124, using an interface circuit 1126, which could be a PtP interface circuit. In alternative embodiments, any or all of the PtP links illustrated in FIG. 11 could be implemented as a multi-drop bus rather than a PtP link.

Chipset 1116 may be in communication with a bus 1128 via an interface circuit 1130. Bus 1128 may have one or more devices that communicate over it, such as a bus bridge 1132 and I/O devices 1134. Via a bus 1136, bus bridge 1132 may be in communication with other devices such as a keyboard/mouse 1138 (or other input devices such as a touch screen, trackball, etc.), communication devices 1140 (such as modems, network interface devices, or other types of communication devices that may communicate through a network), audio I/O devices 1142, and/or a data storage device 1144. Data storage device 1144 may store code 1146, which may be executed by processors 1102a and/or 1102b. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 12:
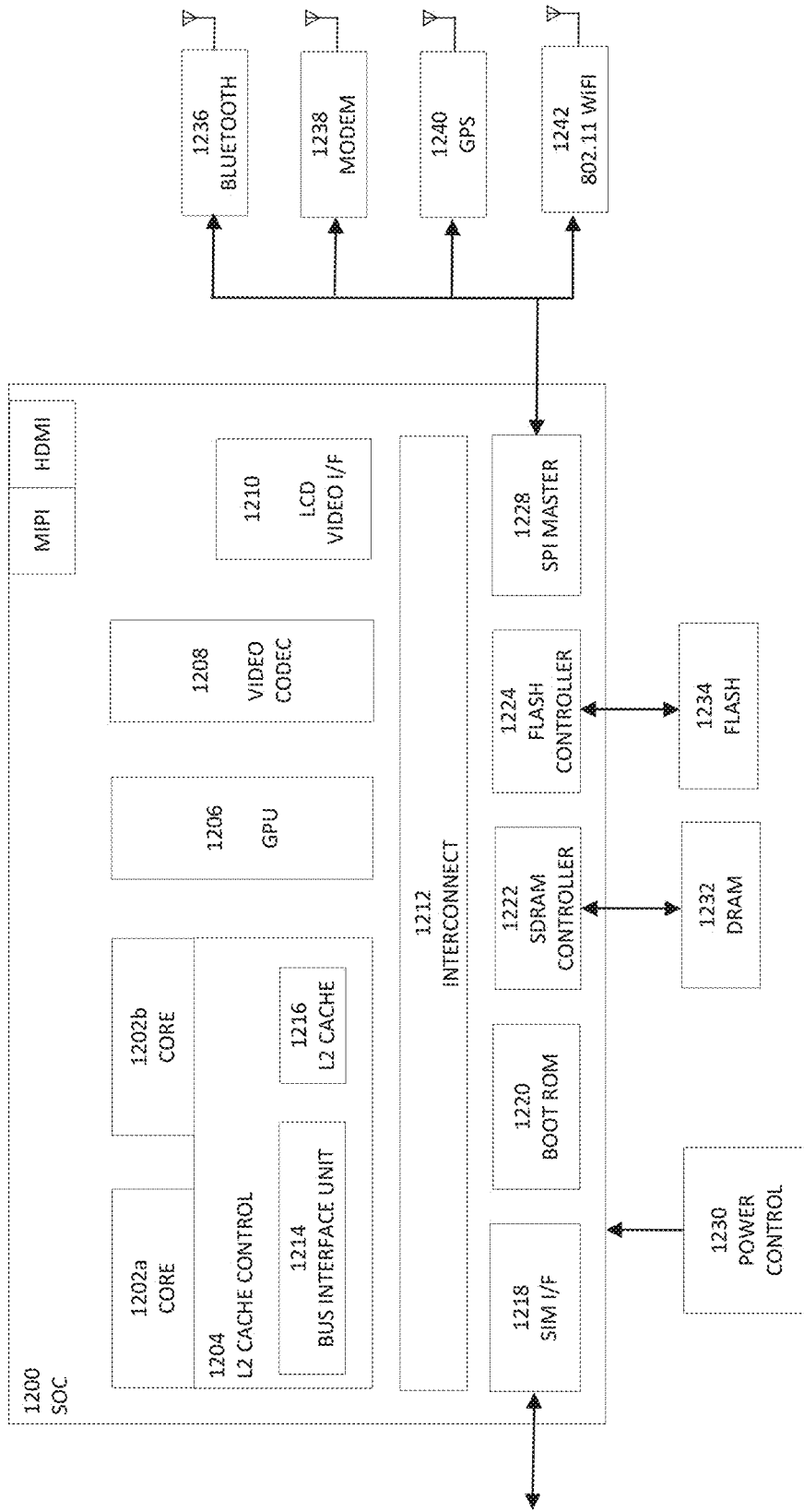
FIG. 12 is a simplified block diagram associated with an example advanced reduced instruction set computer machine (ARM) ecosystem system on chip (SOC) of the present disclosure.

Turning to FIG. 12, FIG. 12 is a simplified block diagram associated with an example ecosystem SOC 1200 of the present disclosure. At least one example implementation of the present disclosure can include the device pairing in a local network features discussed herein and an advanced reduced instruction set computer machine (ARM) component. For example, the example of FIG. 12 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 12, ecosystem SOC 1200 may include multiple cores 1202a and 1202b, an L2 cache control 1204, a graphics processing unit (GPU) 1206, a video codec 1208, a liquid crystal display (LCD) I/F 1210 and an interconnect 1212. L2 cache control 1204 can include a bus interface unit 1214, a L2 cache 1216. Liquid crystal display (LCD) I/F 1210 may be associated with mobile industry processor interface (MIPI)/high-definition multimedia interface (HDMI) links that couple to an LCD.

Ecosystem SOC 1200 may also include a subscriber identity module (SIM) I/F 1218, a boot read-only memory (ROM) 1220, a synchronous dynamic random-access memory (SDRAM) controller 1222, a flash controller 1224, a serial peripheral interface (SPI) master 1228, a suitable power control 1230, a dynamic RAM (DRAM) 1232, and flash 1234. In addition, one or more embodiments include one or more communication capabilities, interfaces, and features such as instances of Bluetooth™ 1236, a 3G modem 1238, a global positioning system (GPS) 1240, and an 802.11 Wi-Fi 1242.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 13:
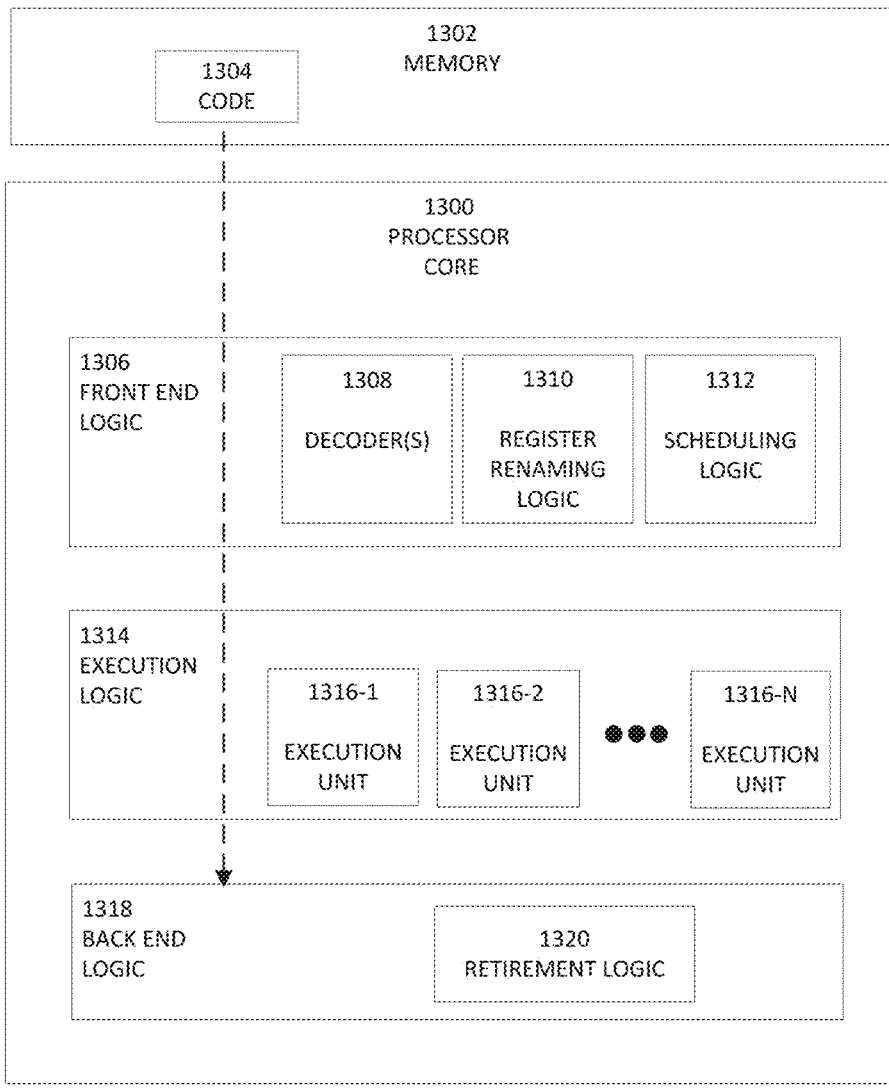
FIG. 13 is a block diagram illustrating an example processor core in accordance with an embodiment.

Turning to FIG. 13, FIG. 13 illustrates a processor core 1300 according to an embodiment. Processor core 1300 may be the core for any type of processor, such as a microprocessor, an embedded processor, a digital signal processor (DSP), a network processor, or other device to execute code. Although only one processor core 1300 is illustrated in FIG. 13, a processor may alternatively include more than one of the processor core 1300 illustrated in FIG. 13. For example, processor core 1300 represents one example embodiment of processors cores 1104a-1104d shown and described with reference to processors 1102a and 1102b of FIG. 11. Processor core 1300 may be a single-threaded core or, for at least one embodiment, processor core 1300 may be multi-threaded in that it may include more than one hardware thread context (or "logical processor") per core.

FIG. 13 also illustrates a memory 1302 coupled to processor core 1300 in accordance with an embodiment. Memory 1302 may be any of a wide variety of memories (including various layers of memory hierarchy) as are known or otherwise available to those of skill in the art. Memory 1302 may include code 1304, which may be one or more instructions, to be executed by processor core 1300. Processor core 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor core 1300 can also include execution logic 1314 having a set of execution units 1316-1 through 1316-N. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor core 1300 allows out of order execution but requires in order retirement of instructions. Retirement logic 1320 may take a variety of known forms (e.g., re-order buffers or the like). In this manner, processor core 1300 is transformed during execution of code 1304, at least in terms of the output generated by the decoder, hardware registers and tables utilized by register renaming logic 1310, and any registers (not shown) modified by execution logic 1314.

Although not illustrated in FIG. 13, a processor may include other elements on a chip with processor core 1300, at least some of which were shown and described herein with reference to FIG. 11. For example, as shown in FIG. 11, a processor may include memory control logic along with processor core 1300. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also useful to note that the operations in the preceding flow diagrams (i.e., FIGS. 6-10-) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed without departing from the scope of the present disclosure. Moreover, certain components may be combined, separated, reduced, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example M1 is a method including capturing an image on a display, where the image includes one or more user interface elements and is part of an application, creating a screen signature of the image, determining an exploration strategy for the image based on the screen signature, and performing the exploration strategy on the image.

In Example M2, the subject matter of Example M1 can optionally include where the exploration strategy includes interacting with each of the one or more user interface elements.

In Example M3, the subject matter of any one of the Examples M1-M2 can optionally include where the exploration strategy is operating system agnostic.

In Example M4, the subject matter of any one of the Examples M1-M3 can optionally where the image is abstracted to create the screen signature.

In Example M5, the subject matter of any one of the Examples M1-M4 can optionally include comparing the screen signature of the image to a plurality of screen signatures in a screen signature database and determining that a first of the plurality of screen signatures matches the screen signature for the image, wherein determining the exploration strategy for the image includes using a stored exploration strategy that is associated with the first of the plurality of screen signatures.

In Example M6, the subject matter of any one of the Examples M1-M5 can optionally include where the screen signature of the image matches two or more of the plurality of screen signatures, wherein each of the two or more of the plurality of screen signatures is associated with a different exploration strategy and each of the different exploration strategies is performed on the image.

In Example M7, the subject matter of any one of the Examples M1-M6 can optionally include where a new image is created when the exploration strategy is performed on the image.

In Example M8, the subject matter of any one of the Examples M1-M7 can optionally include creating a second screen signature of the new image, determining a second exploration strategy for the new image based on the second screen signature, and performing the second exploration strategy on the new image Example C1 is at least one machine readable storage medium having one or more instructions that when executed by at least one processor, cause the at least one processor to capture an image on a display, where the image includes at least one user interface element and is part of an application, create a screen signature of the image, determine an exploration strategy for the image based on the screen signature, and perform the exploration strategy on the image.

In Example C2, the subject matter of Example C1 can optionally include where the image is abstracted to create the screen signature.

In Example C3, the subject matter of any one of Examples C1-C2 can optionally include where the exploration strategy is operating system agnostic.

In Example C4, the subject matter of any one of Examples C1-C3 can optionally include where the one or more instructions that when executed by the at least one processor, further cause the processor to compare the screen signature of the image to a plurality of screen signatures in a screen signature database, determine that a specific screen signature from the plurality of screen signatures in the screen signature database matches the screen signature of the image, and determine the exploration strategy for the image by using a stored exploration strategy that is associated with the specific screen signature that matches the screen signature of the image.

In Example C5, the subject matter of any one of Examples C1-C4 can optionally include where a new image is created when the exploration strategy is performed on the image.

In Example C6, the subject matter of any one of Example C1-C5 can optionally include where the one or more instructions that when executed by the at least one processor, further cause the processor to create a second screen signature of the new image, determine a second exploration strategy for the new image based on the second screen signature, and perform the second exploration strategy on the new image.

In Example C7, the subject matter of any one of Examples C1-C6 can optionally include where the display is a virtual display.

In Example A1, an apparatus can include a security engine. The security engine can be configured to capture an image on a display, where the image includes at least one user interface element and is part of an application, create a screen signature of the image, determine an exploration strategy for the image based on the screen signature, and perform the exploration strategy on the image.

In Example, A2, the subject matter of Example A1 can optionally include where the image is abstracted to create the screen signature.

In Example A3, the subject matter of any one of Examples A1-A2 can optionally include where the exploration strategy is operating system agnostic.

In Example A4, the subject matter of any one of Examples A1-A3 can optionally include where the security engine is further configured to compare the screen signature of the image to a plurality of screen signatures in a screen signature database and determine that a first of the plurality of screen signatures matches the screen signature for the image, wherein the determined exploration strategy for the image is a stored exploration strategy that is associated with the first of the plurality of screen signatures.

In Example A5, the subject matter of any one of Examples A1-A4 can optionally include where a new image is created when the exploration strategy is performed on the image.

In Example A6, the subject matter of any one of Examples A1-A5 can optionally include where the security engine if further configured to create a second screen signature of the new image, determine a second exploration strategy for the new image based on the second screen signature, and perform the second exploration strategy on the new image.

In Example A7, the subject matter of any one of Examples A1-A6 can optionally include where the display is a virtual display.

Example S1 is a system to explore an application, the system including a computer processing unit, memory, and a security engine. The security engine can include a signature engine and a similarity engine. The signature engine can be configured to capture an image on a display, where the image includes one or more user interface elements and is part of an application and create a screen signature of the image. The similarity engine can be configured to compare the screen signature of the image to a plurality of screen signatures in a screen signature database, and determine that a first of the plurality of screen signatures matches the screen signature for the image, wherein an exploration strategy for the image is a stored exploration strategy that is associated with the first of the plurality of screen signatures.

In Example S2, the subject matter of Example S1 can optionally include where a new image is created when the exploration strategy is performed on the image, where the signature engine is further configured to create a second screen signature of the new image, and the similarity engine is further configured to determine a second exploration strategy for the new image based on the second screen signature, where the second exploration strategy is performed on the new image.

In Example S3, the subject matter of any of the Examples S1-S2 can optionally include where the image is abstracted to create the screen signature.

In Example S4, the subject matter of any of the Examples S1-S3 can optionally include where the exploration strategy includes interacting with each of the one or more user interface elements.

In Example S5, the subject matter of any of the Examples S1-S4 can optionally include where the exploration strategy is operating system agnostic.

Example AA1 is an electronic device including means for capturing an image on a display, where the image includes one or more user interface elements and is part of an application, means for creating a screen signature of the image, means for determining an exploration strategy for the image based on the screen signature, and means for performing the exploration strategy on the image.

In Example AA2, the subject matter of Example AA1 can optionally include where the exploration strategy includes interacting with each of the one or more user interface elements.

In Example AA3, the subject matter of any one of Examples AA1-AA2 can optionally include where the exploration strategy is operating system agnostic.

In Example AA4, the subject matter of any one of Examples AA1-AA3 can optionally include where the image is abstracted to create the screen signature.

In Example AA5, the subject matter of any one of Examples AA1-AA4 can optionally include means for comparing the screen signature of the image to a plurality of screen signatures in a screen signature database, means for determining that a specific screen signature from the plurality of screen signatures in the screen signature database matches the screen signature of the image, and means for determining the exploration strategy for the image by using a stored exploration strategy that is associated with the specific screen signature that matches the screen signature of the image.

In Example AA6, the subject matter of any one of Examples AA1-AA5 can optionally include where the screen signature of the image matches two or more of screen signatures from the screen signature database, where each of the two or more of screen signatures from the screen signature database are associated with a different exploration strategy and each of the different exploration strategies are performed on the image.

In Example AA7, the subject matter of any one of Example AA1-AA6 can optionally include where a new image is created when the exploration strategy is performed on the image.

In Example AA8, the subject matter of any one of Example AA1-AA7 can optionally include means for creating a second screen signature of the new image, means for determining a second exploration strategy for the new image based on the second screen signature, and means for performing the second exploration strategy on the new image.

Example X1 is a machine-readable storage medium including machine-readable instructions to implement a method or realize an apparatus as in any one of the Examples A1-A7, AA1-AA8 or M1-M8. Example Y1 is an apparatus comprising means for performing of any of the Example methods M1-M8. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
    capturing an image on a display, wherein the image includes one or more user interface elements and is part of an application;
    abstracting the captured image, wherein each of the one or more user interface elements are abstracted into an abstract object;
    creating a screen signature of the image based on the abstracted captured image that includes the abstracted one or more user interface elements;
    determining an exploration strategy for the image based on the screen signature; and
    performing the exploration strategy on the image wherein, due to the abstraction of the captured image, the determined exploration strategy is an exploration strategy for a different application that, when the different application is executed, the different application creates a second image that is similar to the image displayed on the display.

2. The method of claim 1, wherein the exploration strategy includes interacting with each of the one or more user interface elements.

3. The method of claim 1, wherein the exploration strategy is operating system agnostic.

4. The method of claim 1, further comprising:
    comparing the screen signature of the image to a plurality of screen signatures in a screen signature database; and
    determining that a first of the plurality of screen signatures matches the screen signature for the image, wherein determining the exploration strategy for the image includes using a stored exploration strategy that is associated with the first of the plurality of screen signatures.

5. The method of claim 4, wherein the screen signature of the image matches two or more of the plurality of screen signatures, wherein each of the two or more of the plurality of screen signatures is associated with a different exploration strategy and each of the different exploration strategies is performed on the image.

6. The method of claim 1, wherein a new image is created when the exploration strategy is performed on the image.

7. The method of claim 6, further comprising:
    creating a second screen signature of the new image;
    determining a second exploration strategy for the new image based on the second screen signature; and
    performing the second exploration strategy on the new image.

8. The method of claim 1, wherein the exploration strategy mimics a user's interaction with the image.

9. The method of claim 1, wherein the determined exploration strategy is a preexisting exploration strategy that was created before the image was captured on the display.

10. At least one non-transitory computer-readable medium comprising one or more instructions that when executed by at least one processor, cause the at least one processor to:
    capture an image on a display, wherein the image includes at least one user interface element and is part of an application;
    abstract the captured image, wherein each of the one or more user interface elements are abstracted into an abstract object;
    create a screen signature of the image based on the abstracted captured image that includes the abstracted one or more user interface elements;

determine an exploration strategy for the image based on the screen signature; and perform the exploration strategy on the image wherein, due to the abstraction of the captured image, the determined exploration strategy is an exploration strategy for a different application, wherein when the different application is executed, the different application causes a second image to be displayed that is similar to the image displayed on the display.

11. The at least one computer-readable medium of claim 10, wherein the exploration strategy is operating system agnostic.

12. The at least one computer-readable medium of claim 10, further comprising one or more instructions that when executed by the at least one processor, further cause the processor to:

compare the screen signature of the image to a plurality of screen signatures in a screen signature database; and determine that a first of the plurality of screen signatures matches the screen signature for the image, wherein the determined exploration strategy for the image is a stored exploration strategy that is associated with the first of the plurality of screen signatures.

13. The at least one computer-readable medium of claim 10, wherein a new image is created when the exploration strategy is performed on the image.

14. The at least one computer-readable medium of claim 13, further comprising one or more instructions that when executed by the at least one processor, further cause the processor to:

create a second screen signature of the new image;

determine a second exploration strategy for the new image based on the second screen signature; and perform the second exploration strategy on the new image.

15. The at least one computer-readable medium of claim 10, wherein the display is a virtual display.

16. A system to explore an application, the system comprising:

memory, wherein the memory includes a screen signature database; and a security engine, wherein the security engine includes a signature engine and a similarity engine, wherein the signature engine is configured to:

capture an image on a display, wherein the image includes one or more user interface elements and is part of an application;

abstract the captured image, wherein each of the one or more user interface elements are abstracted into an abstract object; and create a screen signature of the image based on the abstracted captured image that includes the abstracted one or more user interface elements;

wherein the similarity engine is configured to:

compare the screen signature of the image to a plurality of screen signatures in a screen signature database; and determine that a first of the plurality of screen signatures matches the screen signature for the image, wherein an exploration strategy for the image is a stored exploration strategy that is associated with the first of the plurality of screen signatures wherein, due to the abstraction of the captured image, the exploration strategy is an exploration strategy for a different application that causes a second image to displayed that is similar to the image displayed on the display.

17. The system of claim 16, wherein a new image is created when the exploration strategy is performed on the image, wherein the signature engine is further configured to create a second screen signature of the new image, and the similarity engine is further configured to determine a second exploration strategy for the new image based on the second screen signature, wherein the second exploration strategy is performed on the new image.

18. The system of claim 16, wherein the exploration strategy includes interacting with each of the one or more user interface elements.

19. The system of claim 16, wherein the exploration strategy is operating system agnostic.

* * * * *

UNITED STATES PATENT AND TRADEMARK OFFICE
CERTIFICATE OF CORRECTION

PATENT NO. : 11,263,325 B2
APPLICATION NO. : 16/263667
DATED : March 1, 2022
INVENTOR(S) : Yi Zheng et al.

It is certified that error appears in the above-identified patent and that said Letters Patent is hereby corrected as shown below:

In the Drawings

On Drawing Sheet 10 of 13, in box 1004, Line 1, delete "THE THE" and insert -- THE --, therefor.

Signed and Sealed this
Nineteenth Day of April, 2022

Katherine Kelly Vidal
*Director of the United States Patent and Trademark Office*